Sept. 24, 1968  A. JACKNAU ETAL  3,402,635
PHOTOGRAPHIC APPARATUS FOR TAKING PICTURES
OF PRINTS AND DRAWINGS
Filed April 21, 1965  4 Sheets-Sheet 2

Fig.2

Inventors:
Alex JACKNAU,
Fredi WOLF, Walter SCHEFFEL and
Fritz BEYER
by: Arthur O. Klein
their Attorney Sept. 24, 1968   A. JACKNAU ETAL   3,402,635
PHOTOGRAPHIC APPARATUS FOR TAKING PICTURES
OF PRINTS AND DRAWINGS
Filed April 21, 1965   4 Sheets-Sheet 4

Inventors:
Alex JACKNAU, Fredi WOLF
Walter SCHEFFEL, Fritz BEYER
by: Arthur O. Klein
their Attorney

United States Patent Office 3,402,635
Patented Sept. 24, 1968

3,402,635
PHOTOGRAPHIC APPARATUS FOR TAKING PICTURES OF PRINTS AND DRAWINGS
Alex Jacknau and Fredi Wolf, Berlin, Walter Scheffel, Langenfeld, and Fritz Beyer, Winsen, Germany, assignors, by direct and mesne assignments, to Agfa-Gevaert Aktiengesellschaft, Leverkusen, Germany, a corporation of Germany
Filed Apr. 21, 1965, Ser. No. 449,697
Claims priority, application Germany, Apr. 29, 1964,
J 25,743
12 Claims. (Cl. 88—24)

ABSTRACT OF THE DISCLOSURE

A photographic apparatus, comprising a camera table and light projection means and a film magazine adjustably mounted over the camera table. The light projection means and film magazine are mounted on a platform arrangement, on a first base plate of which there is fixedly mounted an objective lens arrangement. A second base plate, which is movably mounted in two directions relative to said first base plate, includes two openings of equal size, the open areas of which can be adjusted by means of a slide, which is movably arranged on said second base plate over said two openings. A scanning and adjusting mechanism is operatively connected to said slide and to the film advance mechanism of said film magazine and is adapted to adjust the advance of the film therein to correspond to the length of said two openings.

Figure 1:
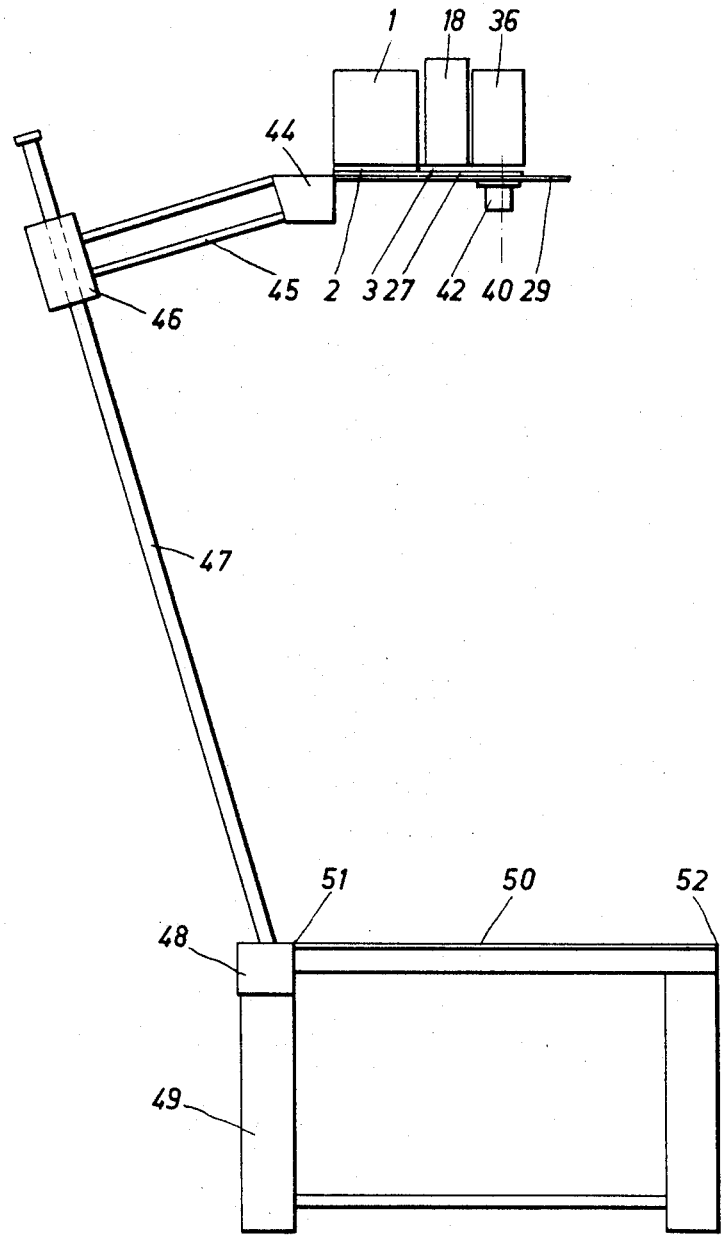

The second base plate is transversely adjustably movably mounted on a platform, which is, in turn, longitudinally adjustably mounted on said first base plate.

The entire platform arrangement is adjustably mounted on an inclined slide rail.

This invention pertains generally to a photographic apparatus for making photographic reproductions on photographic film of prints, drawings or the like.

More specifically, this invention pertains to a photographic apparatus which includes means for stepwise adjusting the distance between the lens of the camera and the sheet which is to be reproduced. This apparatus further includes driving means for operatively moving the film of the camera and means for varying the opening of the camera window or shutter opening. Lastly, the device of this invention includes shutter means and light projecting means.

The known photographic apparatuses of the type suitable for making reproductions of prints, drawings or the like, usually comprise a camera in which the film is moved stepwise a distance corresponding to the length of the picture which, in turn, corresponds to the length of the shutter opening. In these known types of photographic apparatuses, the film is usually advanced manually or by means of an electric motor which is automatically shut off after the film has been moved a predetermined distance. It is further known to activate the objective lens shutter electromagnetically or by means of an electric motor.

It is further known to vary the size of the camera window or the shutter opening by a mechanical arrangement which moves two opposite slide plates towards or away from each other within the opening. It is further known to adjust manually the aforedescribed mechanical arrangement. In order to make reproductions of large sheets, the aforedescribed camera must be situated at a considerable height above the sheet which is to be reproduced. Consequently, a manual adjustment of the aforedescribed mechanical arrangement is difficult and cumbersome. The aforedescribed arrangement has the further disadvantage in requiring continuously the utilization of a film length corresponding to the full camera or shutter opening while only a portion of the utilized film is exposed.

It is further known to project an image of the camera opening onto the camera table in order to visually determine the size of the camera opening. The projection of the camera opening onto the camera table is made prior to the taking of the picture by guiding a light beam through the objective lens of the camera. The distance between the camera table and the camera is then adjusted according to the size of the sheet or object which is to be reproduced by moving the camera up and down. It is further known to adjust the focal length of the objective lens to focus the lens. The latter adjustment is usually made by means of a cam arrangement.

The aforedescribed known photographic apparatuses generally also include projection means which are mounted adjacent to the objective lens arrangement. A swingable shutter and mirror are mounted over the objective and between the latter and the film. The mirror lies flatly on the shutter and the combination mirror and shutter are arranged at an angle of 45° with respect to the intersection of the optical axes of the projection means and objective. In the aforedescribed known arrangement, the combination shutter and mirror is simultaneously also used as means for closing the objective lens, i.e. after the preliminary projection steps for adjusting the camera have taken place, the combination mirror and shutter is swung upwards, thereby clearing the light passage means between the objective and the film window. The aforedescribed arrangement which, at first glance, appears to be advantageous, has the important drawback of unevenly exposing the film. Thus, the light exposure of the film starts at one edge of the film and only reaches the opposite edge of the film after the shutter has been completely opened. Similarly, when closing the shutter, which corresponds to closing the objective, the closing process begins at the last exposed edge of the film. Consequently, the film is exposed in wedge-shaped fashion in a traverse direction to that of the film movement proper, whereby the point of the wedge is situated approximately over the axis of the shutter. It is further known to reduce the size of the film window from one side thereof thereby utilizing only a portion of the full range of the objective lens arrangement. Since the objective and the camera window are generally fixedly mounted with respect to each other, this type of adjustment causes the misalignment of the objective axis with the axis of the reduced film window. Such a misalignment causes a deterioration in the quality of the reproduced image.

Two adjusting arrangements are known for adjusting the distance between the camera and the camera table. In the first arrangement, the optical axis of the camera is located exactly over the center of the camera table. Therefore, the prints, drawings or the like have to be centered as exactly as possible on the camera table, which is a difficult procedure. The camera table in such an arrangement is generally provided with centering means for this purpose. In the second arrangement, the camera is moved along an inclined plane with respect to the camera table. When the camera is farthest removed from the camera table, the optical axis of the camera coincides with the center of the camera table, whereas when the camera is moved closer to the camera table, its optical axis travels towards the front edge of the camera table. In the aforedescribed second arrangement, the prints, drawings or the like must always be placed, regardless of their size or shape, with their respective front edges along the front edge of the camera table. Such an arrangement renders substantial technical and operational advantages because the taking of pictures requires less effort and the sheets can always be positioned accurately on the camera table by using the front edge thereof as a reference.

The device of this invention resembles more closely the second one of the two aforedescribed arrangements.

It is a general object of this invention to provide a photographic apparatus without any of the aforedescribed known operational and constructional disadvantages.

The device of this invention comprises an apparatus which includes a fixed objective over which there is mounted a plate which is movable in two directions. This plate includes two openings of equal size, the open areas of which can be adjusted by means of two slide plates which are jointly adjustable. Each one of said two slide plates is arranged over one of the two openings. The slide plates move jointly across the open areas of the openings so that the adjustment for each opening is the same. The length of the adjusted area of each opening corresponds approximately to the advance movement of the film. A film magazine is mounted over one of the two openings and the projection installation is mounted over the other of said two openings. The driving means are mounted adjacent to the film magazine. The two jointly adjustable slide plates are operatively connected to a scanning and adjusting mechanism which operatively moves along a cam surface. The scanning and adjusting mechanism controls the adjustment of an infinitely variable driving means for the film magazine, whereby the advance movement of the film is controlled by the position of the scanning and adjusting mechanism along the cam surface. The scanning and adjusting mechanism displaces a friction wheel, the outer periphery of which is in contact with a rotatable wheel which is operatively connected to the advance mechanism of the film. The aforementioned two-directionally movable plate forms part of and is mounted on a base plate for the driving means and is jointly movable with the latter in a transverse direction to the objective axis. The film magazine, which is mounted over one of the aforementioned two openings in the two-directionally movable plate, moves jointly therewith.

The device of this invention is further characterized in that the transversely movable base plate for the driving means and the two-directionally movable plate mounted thereon, over an opening of which the film magazine is mounted, and the projection means are all mounted on a platform. This platform, in turn, is longitudinally movably mounted transversely to the objective axis, said movement being limited by stop means. Another feature of the device consists of the objective shutter means being located in the region of the objective axis when the platform is in one limit position, and the aforesaid shutter means being outside the region of the objective axis when the platform is located in the other limit position.

In the device of this invention, all of the aforesaid movements are controlled by electro-mechanical driving means. In this arrangement, four of the driving motors form combination driving means which are mounted on a common base plate. One of the motors is operatively connected to the two jointly movable slide plates and to the scanning and adjusting mechanism for the film advancing means. A second motor controls the action of the objective shutter means. A third motor is operatively connected to the advance film mechanism. Lastly, the fourth motor controls the transverse movement of the base plate and jointly therewith the combination driving means support plate, as well as the parts connected therewith, namely, the two-directionally movable plate with the two openings and with the slide plate independently from their respective positions. The fourth motor further controls the position of the film magazine.

The driving motor for positioning the main platform is mounted adjacent to the projection means and operatively moves the latter, the film magazine and the combination driving means support plate. The latter movement is longitudinal and transverse to the objective axis, so that either one or the other of the two openings is positioned over the objective axis.

The device is further provided with a switch which switches off the lamp of the projection means when the latter are in one or the other limit position.

Figure 3:
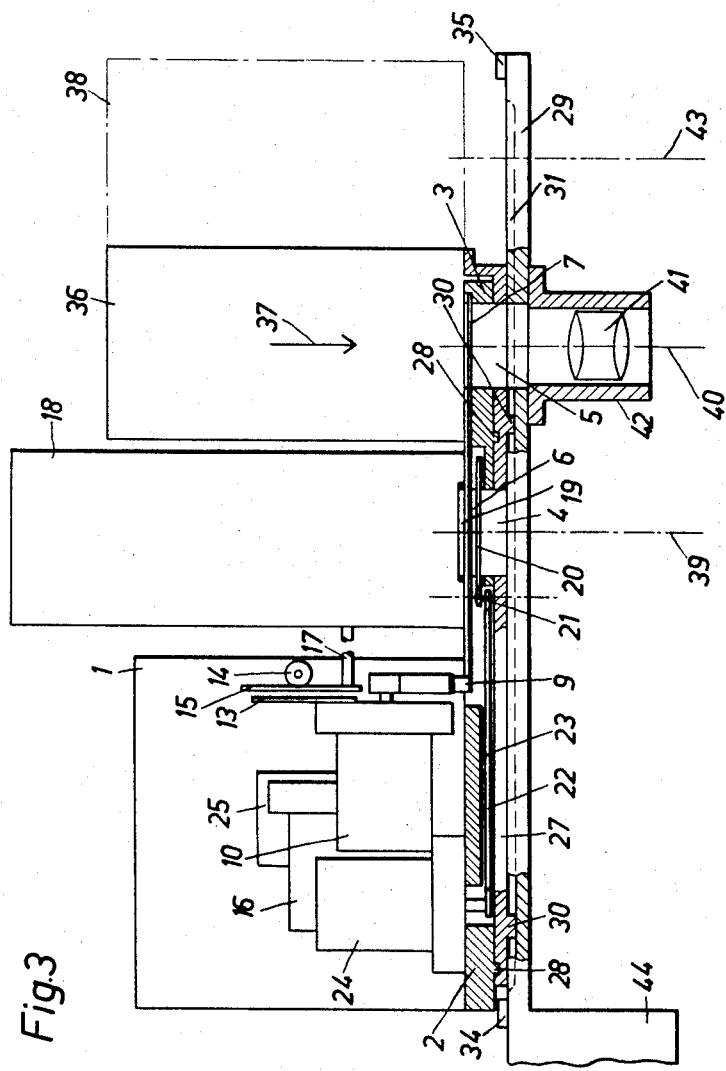
Figure 4:
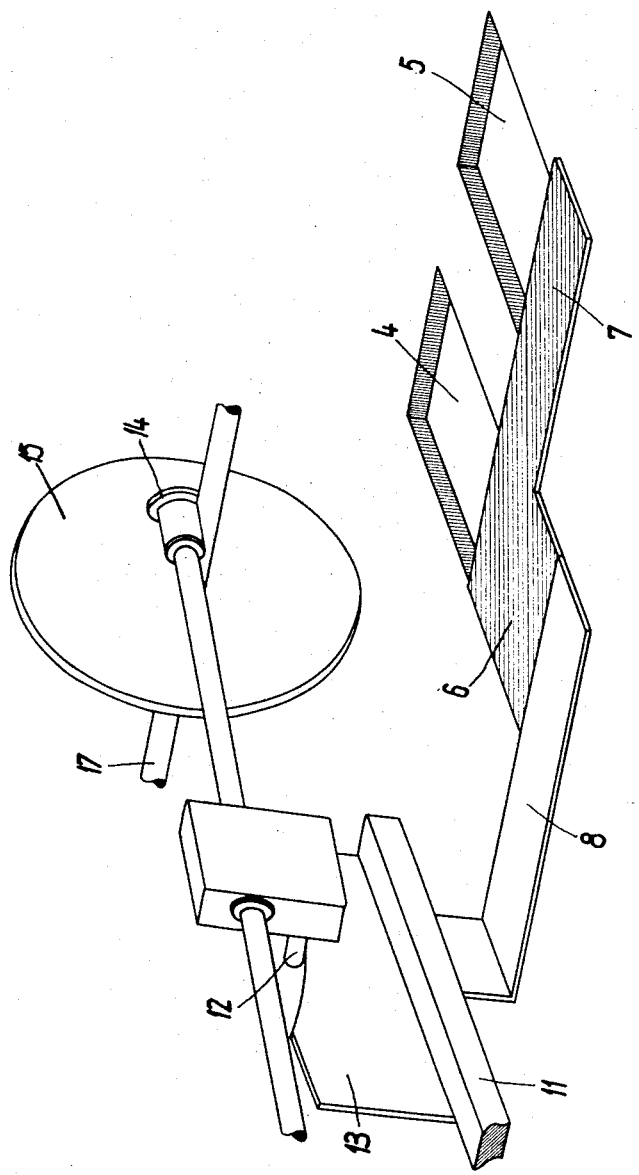

The aforementioned as well as additional objects, features and advantages of the present invention will become more clearly apparent from the following detailed description thereof which is to be read with reference to the accompanying drawings, in which:

FIG. 1 is a side elevation of a schematic representation of the entire apparatus of this invention;

FIG. 2 is a plan view of a portion of the device of this invention which shows the various illustrated parts in greater detail; and FIG. 3 is a side elevation, partially in cross section, of a portion of the device of this invention, which shows the parts illustrated therein in greater detail; and FIG. 4 is a schematic view in perspective illustrating in detail the scanning and adjusting mechanism of the photographic apparatus of this invention.

Referring now specifically to the drawings, the combination driving means housing 1 is mounted on a base plate 2 which has an extension 3. The latter extension has two rectangular openings 4 and 5 of equal size. A slide plate 6 with a narrow extension 7 is slidably movably mounted in a flat depression of the plate 3. By operatively moving the slide plate 6, the open area of the rectangular openings 4 and 5 can be adjusted. This slide plate 6 has an extension 8, from which a gear rack 9 extends. The latter gear rack meshes with a gear wheel heavily bearing thereagainst which is driven by an electric motor 10. A lever system 11 is fixedly connected to the gear rack 9 at one end and is operatively connected to a scanning and adjusting mechanism 12 at its other end. The scanning and adjusting mechanism 12 is guided by a cam surface 13 and is operatively connected to a friction wheel 14. The latter abuts against a large disc 15, mounted on a shaft 17, which forms part of the film advance mechanism (not illustrated in detail) and which is mounted in a film magazine 18. The film 19 is only illustrated in FIG. 3. An electric motor 16 drives via the shaft 17 the film advance mechanism inside the film magazine 18 which advances the film 19. The driving torque for driving the shaft 17 is transferred from the motor 16 by means of a friction wheel 14 and an associate shaft and gear connection illustrated in FIG. 2. The position of the friction wheel 14 with respect to the disc 15 determines the movement of the film advance mechanism. Since the friction wheel 14 is guided by a scanning and adjusting mechanism 12, the latter is capable of making infinitely variable adjustments of the rate of movement of the shaft 17 and, consequently, of the film advance mechanism. The rectangular opening 4 is closed by means of a semi-circular shutter plate 20, which is mounted on an axle 21 provided with a gear wheel. The latter meshes with a large gear wheel 22 rotatably mounted on shaft 23. The gear wheel 22, in turn, meshes with the gear wheel of a motor 24 which is provided with a reduction gear. By means of the aforedescribed connection, the motor 24 drives and controls the movement of the shutter plate 20 which forms the objective shutter.

A platform 27, arranged underneath the base plate 2, is provided with a gear rack 26. The latter meshes with the gear wheel of a reduction gear mechanism of an electric motor 25. The platform 27 is provided with longitudinal grooves 28 which guide meshing projections of the base plate 2, 3. In this manner, the base plate 2, 3 is slidably movable in a transverse direction over the platform 27. The platform 27, in turn, is slidably movable in a longitudinal direction on top of the main base plate 29, which is provided with longitudinal grooves 31 to accommodate meshing projections 30 of the platform 27. The platform 27 is provided with a gear rack 32 which meshes with a gear wheel of a reduction gear mechanism of an electric motor 33. The latter reciprocally drives platform 27 in a longitudinal direction by means of the aforedescribed connection. In this manner, the platform 27 moves longitudinally over the main base plate 29. This movement is stopped by the limit stops 34 and 35 which form part of the main base plate 29. The projection means 36 are mounted on the platform 27 and move jointly therewith. The light being produced by the projection means, travels in the form of a light beam in the direction of arrow 37. When the platform 27 has been moved up to the limit stop 35, the projection means 36 takes the position of the dot-dash line indicated in FIGS. 2 and 3.

A center line 29 is illustrated in FIGS. 2 and 3 for the rectangular opening 4. A second center line 40, which forms also the optical axis of the objective lens 41, is also illustrated in FIGS. 2 and 3. The objective lens arrangement 41 is mounted inside an adjustable lens tube 42. The objective lens arrangement 41 can be adjusted inside the lens tube 42 in the direction of the optical axis 40 by means of well known cam or other adjusting means. A center line 43 is also illustrated in FIGS. 2 and 3. The latter indicates the position of the optical axis 40 when the platform 27 abuts against the limit stop 35. The lens tube 42 is connected to the underside of the main plate 29. The latter is integral with a base portion 44 which is slidably connected by means of an arm 45 and a slide member 46 on an oblique slide-rail 47. The lower end of the slide-rail 47 is fixedly connected to a receiving member 48, which forms part and is integral with a camera table 49. The top portion of the camera table 49 comprises a camera plate 50 which is respectively limited at its forward and rear end by the lines 51 and 52.

The photographic apparatus of this invention operates as follows:

The device of this invention of which one embodiment has been illustrated in the drawings, is adjusted for all of its operations by means of electric motors. The switching means for shutting off and turning on the individual electric motors are mounted on a suitable location, such as a master switch (not illustrated). The projection lamps of the device are energized during the entire adjusting operations for the device.

Preparatory to the taking of a picture, the sheet which is to be reproduced is placed on the camera plate 50 so that one of its edges is aligned with the line 52 of the camera plate 50. Thereafter, a contact switch is activated which causes the energization of electric motor 33 which begins to turn, thereby moving the platform 27 in a longitudinal direction along the grooves 31 until the platform 27 abuts against the limit stop 34. This position of the platform 27 is illustrated in FIGS. 1, 2 and 3. In the aforedescribed position, the opening 5 in base plate extension 3 is moved over the objective lens arrangement 41 which is mounted by means of a lens tube 42 on the main base plate 29. The projection lamps are automatically turned on when the projection means have reached this position. The light beam of the projection means 36, the arrangement of which does not form an integral part of this invention, is guided along the direction of arrow 37 through the opening 5 and the objective lens arrangement 41 and falls on the camera plate 50, thereby projecting an outline of the opening 5 thereon.

The size of the outline projected onto camera plate 50 can now be compared with the size of the sheet which is to be reproduced and the necessary camera adjustments are then made to have the two sizes correspond to each other. A known switch, not forming an integral part of the invention, activates a mechanism which moves the upper camera installation along the oblique rail 47 up or down until the projected outline has two opposite edges coinciding with the corresponding opposite edges of the sheet to be reproduced.

At this point, a check is made to ascertain how much larger the projected outline is, when the opening 5 is fully open, than the sheet that is to be reproduced. Should the projected outline be larger than the sheet to be reproduced, an electric motor 10 is activated by means of a switch (not illustrated). The electric motor 10 by means of its gear wheel acts upon a gear rack 9 which moves via the extension 8 the slide plate 6 and extension 7, respectively, across the openings 4 and 5, the areas of which are thereby reduced in size. Slide plate 6 and extension 7 are moved until the size of the projected outline corresponds to the size of the sheet which is to be reproduced. Thereafter, the electric motor 10 is deenergized. The motor 10 is provided with advance and reverse means which cause the slide plate 6 and extension 7 to move back and forth, thereby permitting a fine adjustment of the size of the openings 4 and 5.

In the embodiment illustrated in FIG. 2, the slide plate extension 7 covers approximately a third of the opening 5. The full area of the opening 5 is indicated in FIG. 2 of the drawing by means of dot-dash diagonal lines and the reduced area of opening 5 is indicated in FIG. 2 of the drawing by dash diagonal lines. Since the extension 7 and slide plate 6 form a unit, the opening 4 is reduced in size by an equal amount to that of opening 5.

The centers of the areas of openings 4 and 5, the areas of which have been reduced by slide plate 6 and extension 7, are indicated by the intersections of the dash diagonal lines. The center point of opening 5 now no longer corresponds to the optical axis of the objective lens arrangement 41. This condition is optically unsound and has to be corrected. The correction adjustment is made by activating another contact switch (not illustrated), which causes the energization of a motor 25 which by means of gear rack 26 moves the entire combination driving means housing 1 mounted on base pate 2 and all parts mounted thereon. Since the extension 3 is integral with the base plate 2, the former also moves in conjunction with the base plate 2 and, consequently, the openings 4 and 5 are similarly displaced. The base plate 2 and its extension 3 move in longitudinal grooves 28 which are located in the platform 27. The film magazine 18, which is removably secured over the opening 4, moves jointly with the base plate extension 3. This transverse movement is stopped after the intersection 1 of the dash lines, which indicate the center of the open area of opening 5, coincides with the objective axis 14. Thereafter the driving motor 25 is deenergized. The latter motor includes reversing means so that a fine adjustment can be made by moving the plate 2 back and forth in a transverse direction. After the center of opening 5 and the axis of the objective lens 41 coincide, the adjustment procedure is terminated.

One of the objects of this invention is to conform the consumption of film to the size of the open areas of openings 4 and 5. To obtain this goal, the device of this invention includes an automatic film advancing mechanism which adjusts the rate of film advance. This is accomplished by having the gear rack 9, the movement of which corresponds to the movement of the slide plate 6 and extension 7, control the size of the film advance. A lever system 11 is operatively connected to the gear rack 9 and acts upon a scanning and adjusting mechanism 12 which includes a portion that slides along a cam surface 13. The scanning and adjusting mechanism 12 is, in turn, operatively connected to a friction wheel 14 which abuts against a circular disc 15. The friction wheel 14 is positioned by the scanning and adjusting mechanism 12 closer or farther from the center of the circular disc 15, depending on the required advance of the film. This arrangement renders an infinitely variable adjustment of the film advance since the motor 16, which advances the film, always turns at a constant rate. This arrangement causes the advance of a length of film which corresponds to the adjusted size of the open areas of openings 4 and 5. The actual transport mechanism, which moves the film 19 inside the film magazine 18, can correspond to any number of known mechanisms and does not form an integral part of the instant invention.

The preliminary adjustment of the camera is terminated after all of the aforedescribed operations and the apparatus is now ready to be brought into the position for actually taking a picture. This is done by activating a switch (not illustrated) which causes the energization of the motor 33. The latter via a gear wheel and gear rack connection moves the platform 27 with all the parts mounted thereon in a longitudinal direction along the grooves 31 in the main base plate 29 until the right end of platform 27 abuts against the limit stop 35. At this point, motor 33 and the projection means 36 are automatically switched off. This longitudinal movement of the platform 27 causes the center line 39 of the opening 4, which is situated over the film 19, to coincide with the objective axis 40, whereas the center line of the projection means coincides now with the center line 43 illustrated in FIGS. 2 and 3, the projection means 36 now taking the position illustrated by the dot-dash lines in FIGS. 2 and 3. When the apparatus is in the last described position, it is ready for taking a picture.

A semi-circular shutter plate 20, rotatably mounted on an axle 21 and provided with a gear wheel, is mounted directly underneath the opening 4. The gear wheel on axle 21 meshes with a large gear wheel 22 which is rotatably mounted on shaft 23. The large gear wheel 22, in turn, meshes with a gear wheel of a motor 24 which is mounted in the drive mechanism housing 1 on the base plate 2. By activating a switch (not illustrated), the motor 24 is energized, thereby rotating the semi-circular shutter plate 20. The switching means for the motor 24 include known automatic contact switching means with automatically shut off motor 24 after the semi-circular shutter plate 20 has rotated 360° about its axle 21. The rotation of the semi-circular shutter plate 20 progressively exposes the opening 4 until the latter is fully exposed, and thereafter, closes the same opening starting at the point which was first exposed. In this manner, the semi-circular plate 20 forms the shutter for the objective lens arrangement which exposes the film 19. Obviously, only that portion of the film 19 is exposed which is visible from below through the opening 4, i.e., the area of opening 4 which is not covered by the slide plate 6.

After the film 19 had been exposed, that is to say after the semi-circular plate 20 has returned to its original starting position and again covers the opening 4, the film 19 must be advanced a portion corresponding to the exposed film. The movement of the film may take place by means of any one of a number of known film transport mechanisms which do not form an integral part of this invention and which are activated by turning on a switch (not illustrated) which energizes motor 16. The rotation of the motor 16 is transferred by the illustrated and described connections to the shaft 17, which, in turn, acts in any one of a number of known ways on the film transport mechanism operatively mounted in the inside of film magazine 18 which then advances film 19 a predetermined amount. After the film 19 has advanced a predetermined amount corresponding to the adjusted film advance, the motor 16 is automatically shut off by known means. These known means for shutting off the motor 16 may, for example, comprise a partially covered contact disc or the like.

The operation for taking the picture is now terminated. Additional pictures of equal size can be taken without readjusting the camera. In the event, pictures of a different format are to be taken, the adjusting process, as described above, has to be done once more.

The photographic apparatus of this invention offers many advantages when compared with the known devices.

The principal advantage lies in the fact that the slide plate, which determines the size of the reproduction, is directly coupled to the adjusting means for the film advance mechanism. This arrangement eliminates the waste of film by using only as much film as is exposed. When the opening is fully opened, a length of film corresponding to a full opening is used. When the opening is two-thirds (⅔) open, as illustrated in FIG. 2, a corresponding two-thirds (⅔) amount of the film is used.

A further advantage lies in the fact that for each reproduction the most favorable optical adjustment is present, namely, the center of the free opening coincides with the objective axis. This adjustment is independent of the size or format of the sheet to be reproduced.

A further advantage of the apparatus of this invention lies in the shutter arrangement. The latter provides for an exposure of equal intensity over the entire exposed film. In contra-distinction thereto, the known flap arrangement renders an exposure of uneven intensity over the film.

A further advantage lies in the arrangement of having all but one driving motor, arranged underneath one housing and mounted on one plate. The film magazine is mounted independently on this driving motor. The aforedescribed arrangement makes the mounting and dismounting of the film magazine easier. Furthermore, the film magazine may be manufactured out of lighter material which renders a substantial practical advantage. It is, of course, possible in the aforedescribed arrangement to use interchangeably several film magazines.

This invention is not limited to the embodiment illustrated in FIGS. 1, 2 and 3. The illustrated embodiment is a precision apparatus in which all adjustments take place by means of electric motors which are activated by manually turning on or off switches, but which can also be automatically switched on or off. It is obviously within the scope of this invention to provide an apparatus of more simple constructions in which some of the adjustments are not made by means of electric motors, but are made manually. For example, the adjustment of the slide plate and of the film advance could be made by activating manually a mechanism. Furthermore, the slidable movement of the platform and of the main base plate and the parts connected therewith could also be done by manually activating suitable mechanisms. The type of mechanism chosen, electric motor or manual, will not affect the spirit and scope of the inventive concept of the described apparatus of this invention.

Although our invention has been illustrated and described with reference to the preferred embodiments thereof, we wish to have it understood that it is in no was limited to the details of such embodiments but is capable of numerous modifications within the scope of the appended claims.

Having thus fully disclosed our invention, what we claim is:

1. An apparatus for making photographic reproductions on photographic film or blueprints, drawings and the like, comprising in combination, a base plate having an opening and at least one longitudinal groove; objective lens means adjustably mounted on said base plate in axial alignment with said opening; a platform slidably mounted in said longitudinal groove in said base plate for longitudinal reciprocal movement therein, said platform having at least one transverse groove; a second base plate slidably mounted in said transverse groove in said platform for transverse reciprocal movement therein, said platform and said second base plate having respectively two openings; said second base plate having plate receiving means; a slide movably mounted in said plate receiving means and being adapted to move over said two openings in said second base plate to cover said two openings a predetermined amount; a film magazine, containing a film transport mechanism for operatively advancing a light sensitive film, operatively mounted on said second base plate over a first one of said two openings; light projecting means mounted on said second base plate over a second one of said two openings; said light projecting means being adapted to project a light beam through said second opening; shutter means operatively mounted on said second base plate under said first opening for selectively exposing it, and first, second, third, fourth and fifth driving means respectively operatively connected to said platform, said second base plate, said slide, said film transport mechanism and said shutter means for respectively operatively driving them; whereby the position of said first opening in said second base plate and said associated film magazine mounted over said first opening on said second base plate can be selectively positioned over a second one of said two openings on said platform in optical alignment with said objective lens means after the position of said platform relative to said base plate has been adjusted by means of said first driving means and the size of said first and second openings in said second base plate have been adjusted by means of said slide.

2. An apparatus for making photographic reproductions on photographic film of blueprint, drawings and the like as set forth in claim 1, including a scanning and adjusting mechanism operatively connecting said slide and said film transport mechanism in accordance with the predetermined position of said slide.

3. An apparatus for making photographic reproductions on photographic film of blueprint, drawings and the like as set forth in claim 1, wherein said two openings in said platform and said second base plate have substantially equal cross-sectional areas, said second base plate being movable to a first position, wherein a first opening of said two openings therein is aligned with a first opening of said two openings in said platform to a second position wherein a first opening of said two openings in said second base plate is aligned with a second opening of said two openings in said platform.

4. An apparatus for making photographic reproductions on photographic film of blueprint, drawings and the like as set forth in claim 1, wherein said film transport mechanism comprises a shaft axially mounted therein and extending outside of said film magazine, a disc axially mounted on said shaft outside of said film magazine; and a scanning and adjusting mechanism operatively connected to said slide, said scanning and adjusting mechanism comprising friction wheel means comprising a friction wheel which abuts against said disc.

5. An apparatus for making photographic reproductions on photographic film of blueprints, drawings and the like, comprising in combination, table means, a support member upwardly extending from said table means, a base plate reciprocably movably mounted on said support member, said base plate having an opening and at least one first groove; objective lens means adjustably mounted on said base plate in axial alignment with said opening; a platform mounted in said first groove in said base plate for slidable reciprocal movement therein; first electric motor drive means operatively connected to said platform for reciprocably moving the same in said first groove, said platform having at least one second groove; a second base plate mounted in said second groove for reciprocal movement therein, second electric motor drive means operatively connected to said second base plate for reciprocably moving the same in said second groove, said platform and said second base plate having respectively a pair of openings, each one of said pair of openings in said platform being aligned with an opening of said pair of openings in said second base plate; said second base plate having plate receiving means; a slide reciprocably movably mounted in said plate receiving means and being adapted to move a predetermined amount over said two openings in said second base plate; third electric motor drive means operatively connected to said slide for reciprocably moving the same in said plate receiving means; a film magazine, having operatively mounted therein a film transport mechanism for operatively advancing a light sensitive film, being mounted on said second base plate over a first one of said pair of openings therein; light projecting means mounted on said second base plate over a second one of said pair of openings therein, said light projecting means being adapted to project a light beam through said second opening; shutter means operatively mounted on said second base plate adjacent to said first one of said pair of openings therein for selectively exposing it; fourth electric drive means operatively connected to said shutter means; fifth electric motor drive means operatively connected to said film transport mechanism for advancing said light sensitive film; said second base plate being adapted to move from a first position wherein said pair of openings in said second base plate and said platform are aligned with each other to a second position wherein said first one of said pair of openings in said second base plate is aligned with a second one of said pair of openings in said platform and with said opening in said base plate, the other hole of each pair of openings in said second base plate and in said platform being non-aligned with respect to each other in said second position.

6. An apparatus for making photographic reproductions of the character described, comprising in combination, base plate means having a first opening; objective lens means mounted on said base plate means over said first opening; a platform reciprocably mounted on said base plate means, second base plate means reciprocably mounted on said platform, said platform and said second base plate each having a pair of openings, said second base plate being movable to a first position wherein a first hole of said pair of holes therein is aligned with a first hole of said pair of holes in said platform to a second position wherein a first hole of said pair of holes in said second base plate is aligned with a second hole of said pair of holes in said platform; a slide movably mounted in said apparatus and being adapted to operatively move a predetermined amount over said pair of holes in said second base plate and in said platform; light projecting means mounted in said apparatus over the second opening of said pair of openings in said second base plate, film magazine means having a film transport mechanism mounted therein, mounted in said apparatus over said first opening of said pair of openings in said second base plate; shutter means operatively connected to said film magazine for selectively exposing a light sensitive film mounted on said film transport mechanism; and a scanning and adjusting mechanism operatively connecting said slide and said film transport mechanism for adjusting the film transport mechanism in accordance with the predetermined position of said slide.

7. An apparatus for making photographic reproductions of the character described, comprising in combination, base plate means having a first opening; objective lens means mounted on said base plate means in axial alignment with said first opening; a platform reciprocably mounted on said base plate means; second base plate means reciprocably mounted on said platform, said platform and said second base plate each having a pair of openings substantially of equal cross sectional areas, said second base plate being movable to a first position wherein a first hole of said pair of holes therein is aligned with a first hole of said pair of holes in said platform to a second position wherein a first hole of said pair of holes in said second base plate is aligned with a second hole of said pair of holes in said platform; a slide reciprocably movably mounted in said apparatus and being adapted to operatively move a predetermined amount over said pairs of holes in said second base plate and in said platform; light projecting means mounted on said second base plate over the second opening of said pair of openings in said second base plate; film magazine means, having a film transport mechanism mounted therein, mounted on said second base plate over said first opening of said pair of openings in said second base plate; shutter means operatively connected to said film magazine for selectively exposing a light sensitive film mounted on said film transport mechanism; and a scanning and adjusting mechanism operatively connecting said slide and said film transport mechanism for adjusting the film transport mechanism in accordance with the predetermined position of said slide.

8. The apparatus as set forth in claim 7, wherein said base plate means comprise stop means at each longitudinal end thereof for limiting the reciprocal movement of said platform.

9. The apparatus as set forth in claim 7, wherein said shutter means comprise a semi-circular plate rotatably mounted on said second base plate means, said semi-circular plate being adapted to move from a first position wherein said semi-circular plate covers said first hole in said second base plate, to a second position wherein said semi-circular plate exposes said first hole in said second base plate.

10. The apparatus as set forth in claim 6, including first electric motor operatively connected to said platform for reciprocably moving said platform over said base plate means; second electric motor means operatively connected to said second base plate for reciprocably moving said second base plate over said platform, third electric motor means operatively connected to said slide for operatively moving said slide over said second base plate, fourth electric motor means operatively connected to said film transport mechanism for operatively advancing said film transport mechanism, and fifth electric motor means operatively connected to said shutter means for driving said shutter means to cover or expose said first hole in said second base plate.

11. An apparatus for making photographic reproductions of the character described, comprising in combination, base plate means (29) having a first opening; objective lens means (41) mounted on said base plate means in axial alignment with said first opening; a platform (27) reciprocably mounted on said base plate means; second base plate means (2, 3) reciprocably mounted on said platform, said platform and said second base plate each having a pair of openings (4, 5) substantially of equal cross-sectional areas, said second base plate being movable to a first position wherein a first hole of said pair of holes therein is aligned with a first hole of said pair of holes in said platform to a second position wherein a first hole of said pair of holes in said second base plate is aligned with a second hole of said pair of holes in said platform; a slide (6, 7) reciprocably movably mounted in said apparatus and being adapted to operatively move a predetermined amount over said pairs of holes in said second base plate and in said platform; light projecting means (36) mounted on said second base plate over the second opening of said pair of openings in said second base plate, film magazine means (18), having a film transport mechanism mounted therein, mounted on said second base plate over said first opening of said pair of openings in said second base plate; shutter means (20) operatively connected to said film magazine for selectively exposing a light sensitive film (19) mounted on said film transport mechanism; and a scanning and adjusting mechanism (12, 13) operatively connecting said slide and said film transport mechanism for adjusting the film transport mechanism in accordance with the predetermined position of said slide.

12. The apparatus as set forth in claim 10, wherein said second, third, fourth and fifth electric motor means are mounted on said second base plate means.

References Cited

UNITED STATES PATENTS 2,813,456  11/1957  Ostrov ---------------- 88—24
3,253,502  5/1966  Wally ---------------- 88—24

NORTON ANSHER, *Primary Examiner.*

R. A. WINTERCORN, *Assistant Examiner.*